(12) United States Patent
Filippenko

(10) Patent No.: US 7,460,348 B2
(45) Date of Patent: Dec. 2, 2008

(54) OVERLOAD DETECTOR/ENUNCIATOR

(76) Inventor: Alexander S. Filippenko, 209 Caniff La., Cary, NC (US) 27519

( * ) Notice: Subject to any disclaimer, the term of this patent is extended or adjusted under 35 U.S.C. 154(b) by 317 days.

(21) Appl. No.: 11/219,200

(22) Filed: Sep. 6, 2005

(65) Prior Publication Data

US 2007/0053123 A1 Mar. 8, 2007

(51) Int. Cl.
*H02H 3/24* (2006.01)
*H02H 1/00* (2006.01)
(52) U.S. Cl. .................................................. 361/92
(58) Field of Classification Search ................. 361/78, 361/92
See application file for complete search history.

(56) References Cited

U.S. PATENT DOCUMENTS

| | | | | |
|---|---|---|---|---|
| 3,689,887 A | * | 9/1972 | La Falce et al. ............. 340/3.51 |
| 3,842,249 A | * | 10/1974 | Geyer et al. .................. 700/295 |
| 4,432,031 A | * | 2/1984 | Premerlani .................... 361/97 |
| 5,646,512 A | * | 7/1997 | Beckwith ..................... 323/257 |
| 7,053,497 B2 | | 5/2006 | Sodemann et al. |
| 7,193,830 B2 | * | 3/2007 | Fournier et al. ............. 361/111 |
| 2004/0075343 A1 | * | 4/2004 | Wareham et al. .............. 307/39 |

* cited by examiner

*Primary Examiner*—Ronald W Leja

(57) ABSTRACT

An overload detector/enunciator circuit. The overload detector/enunciator circuit detects an overloaded condition of a backup generator and provides a relatively immediate indication of the overload to occupants of the residence or facility receiving power from the backup generator such that correction of the overload condition can be effected before any damage to the generator or load devices can occur.

32 Claims, 8 Drawing Sheets

OVERLOAD DETECTOR/ENUNCIATOR

CROSS-REFERENCE TO RELATED PATENTS

Not applicable

STATEMENT REGARDING FEDERALLY SPONSORED RESEARCH OR DEVELOPMENT

Not applicable

FIELD OF THE INVENTION

The present invention relates to residential backup generators, and particularly to an overload detector/enunciator circuit for use with backup generators.

BACKGROUND OF THE INVENTION

Small electric generators have been used for short term emergency backup power in residential and small commercial applications for many years. These generators were commonly connected to small critical loads, such as refrigerators, freezers, hotplates, pumps, lighting, fans, radios, etc., one or two at a time using extension cords. As we have become more dependent on electric power the number of loads that we define as critical has increased. Generator manufactures and electrical distribution equipment manufactures are now providing permanently installed generator sub-panels that include a power source transfer or selector switch and a small number of branch circuit breakers for connecting to circuits that are deemed to be critical by the home or small business owner. These critical circuits can be selectively connected to either the utility grid or a local backup generator by the power source transfer or selector switch. Each of these branch circuits can be connected to a single load or a number of loads, a combination of these loads can produce a total load greater than the rated output capacity of the backup generator. Therefore, it is possible for someone to turn on one of the loads or for an automatic operation, such as a pressure switch or thermostat, to turn on a load that, in combination with other active loads, will place the generator in an overloaded condition. Since the backup generator must be located outside the residence or facility, the occupants of the residence or facility may not have any immediate indication that the generators overload condition exists. An overload condition can cause damage to the generator and the connected loads if it is not corrected. Therefore, a means for indicating a generator overload to occupants of the residence/facility as soon as possible is important so that correction of the overload condition can be made before damage occurs. It is also understood that the occupant of the residence of facility may want to use as many of the selected critical loads as possible without causing an overload condition. Therefore, knowing when the activation of a particular load causes an overload condition will permit the occupant to selectively activate as many of the critical loads as possible without causing an overload condition.

BRIEF DESCRIPTION OF THE DRAWINGS

The features of the invention will be more clearly understood from the following detailed description of the invention read together with the drawings in which.

Figure 1:
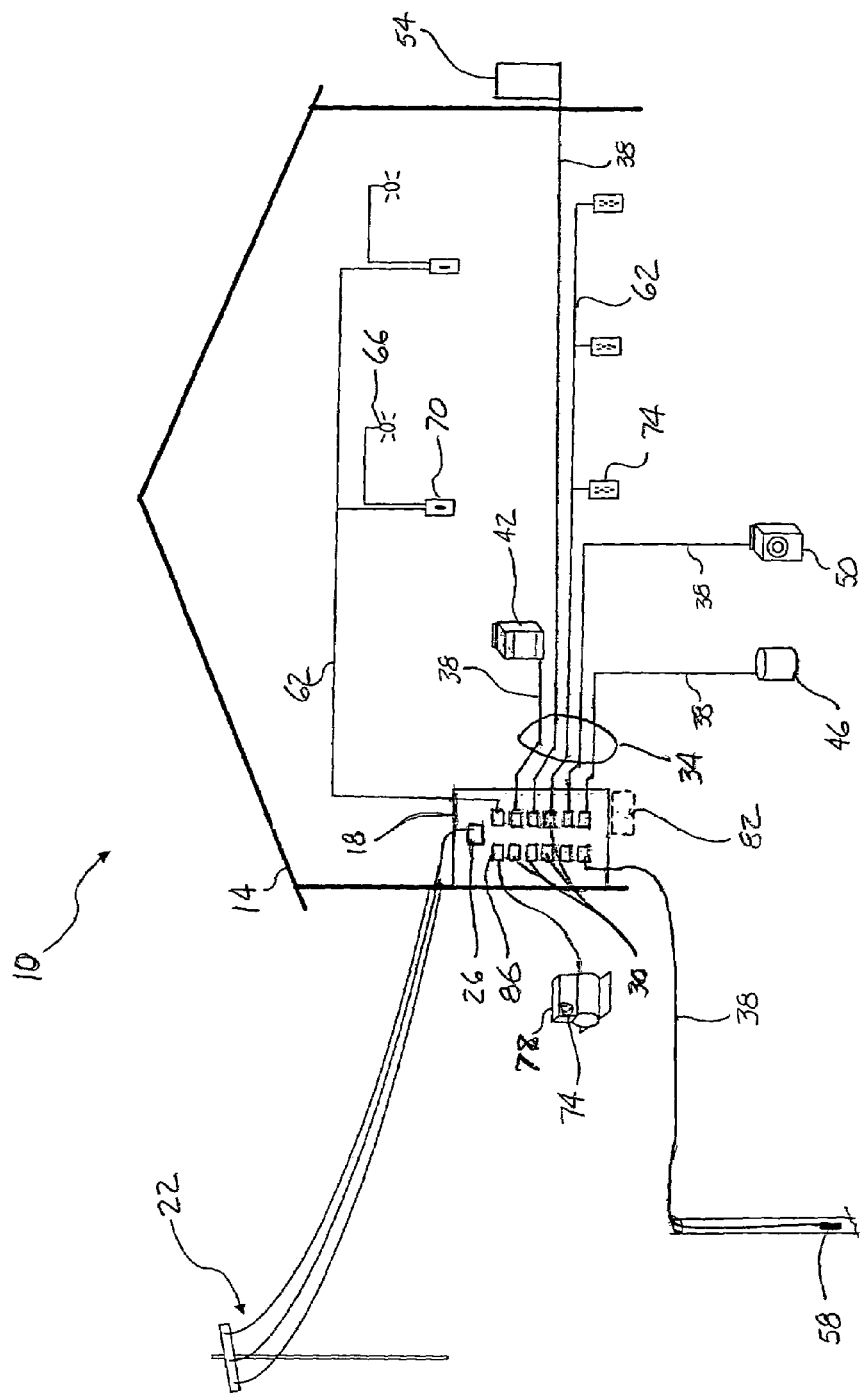
FIG. 1 illustrates a typical residential or facility electrical distribution system in which an overload detector/enunciator constructed in accordance with the present invention is intended to operate.

Before one embodiment of the invention is explained in detail, it is to be understood that the invention is not limited in its application to the details of construction described herein or as illustrated in the drawings. The invention is capable of other embodiments and of being practiced or being carried out in various other ways. Further, it is to be understood that the phraseology and terminology used herein is for the purpose of description and should not be regarded as limiting.

DETAILED DESCRIPTION OF THE DRAWINGS

FIG. 1 illustrates in general a typical electrical distribution system 10 that might be found in a residence or small commercial facility 14. A service entrance panel 18 located in the residence/facility 14 receives primary power from the utility grid 22 through a main circuit breaker 26 and has a number of branch circuit breakers 30 for protecting and selectively providing power to branch circuits 34 of the electrical distribution system 10. The branch circuit 34 can be dedicated circuits 38 for items such as a range 42, a hot water heater 46, a clothes dryer 50, a HVAC system 54, a well pump 58, etc. or general circuits 62 for lighting elements 66 including control switches 70 and/or electrical receptacles 74. Natural disasters and other occurrences can cause the utility grid 22 to fail for extended periods. During these extended periods and for shorter periods of interrupted utility electric service, emergency backup power can be provided by a local power source such as a generator 78. The generator 78 generally includes one or more 110 or 220 VAC receptacles 74 for receiving an extension cord or a power transfer cable. In permanent or semi-permanent installations a power source transfer device (not shown) is provided for selecting which of the power sources 22 or 78, will provide electric power to the electrical distribution system 10. The power source transfer device can be located in the service entrance panel 18, a separate enclosure (not shown) or a commercially available generator sub-panel 82. The generator 78 will usually be connected to the service entrance panel 18 or generator sub-panel 82 through a back fed circuit breaker 86. Typically, the power output (kW) of the generator 78 will not be large enough to provide power for all of the loads in the residence/facility 14 and may not provide sufficient power for a few selected critical loads to operate at the same time. Therefore, the generator 78 could become overloaded, which can cause damage to the generator 78 and/or one or more of the loads connected to the generator 78 if the overload condition is not corrected. Since the generator 78 must be located outside the residence/facility 14 for safety reasons, occupants of residence/facility 14 can not hear changes in engine noise due to the overload condition. They also may not notice any significant change in load performance caused by the overload condition. Therefore, some means for alerting the occupants inside the residence/facility 14 of the generator's overload condition is desirable.

Figure 2:
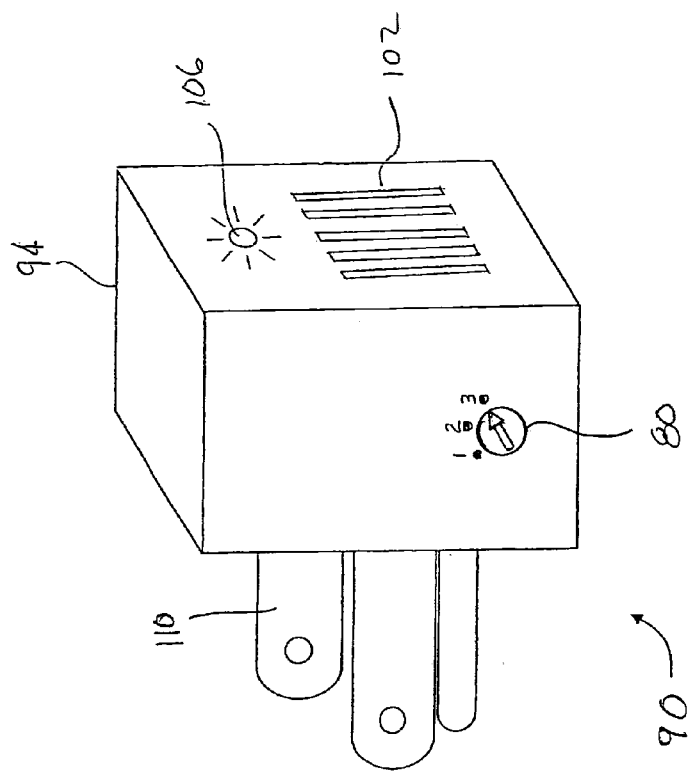
FIG. 2 illustrates one embodiment of an overload detector/enunciator constructed in accordance with the present invention.
Figure 2:
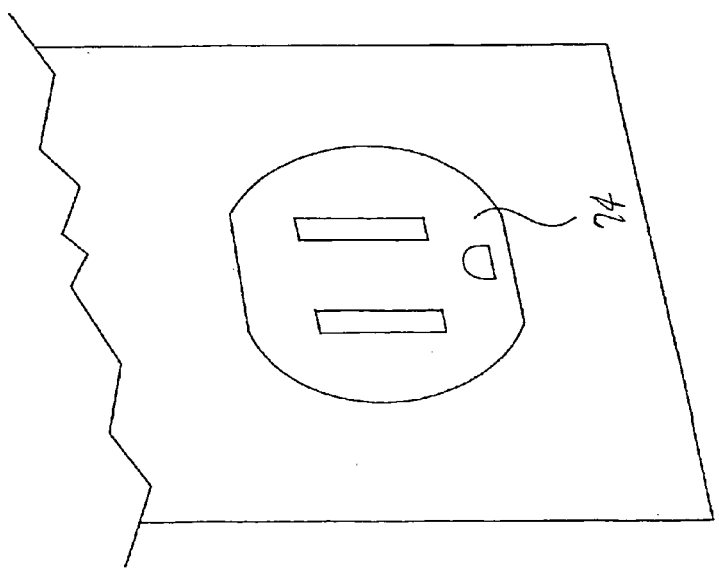

FIG. 2 illustrates one embodiment of an overload detector/enunciator 90, constructed in accordance with the present invention. In this embodiment, the overload detector/enunciator 90 includes a housing 94, an overload detector/enunciator circuit 98 (FIG. 3), which can include an audible enunciator 102 and/or a visual indicator 106 and a plug means 110 for plugging into one of the electrical receptacles 74 located in one of the general circuits 62 that is receiving power from the generator 78. A dial 80 for a range selector switch SW, described later with respect to FIG. 5B, can be accessed through the housing 94. The overload detector/enunciator circuit 98 is in electrical communication with the generator 78 and can monitor and evaluate the quality of certain components of the power produced by the generator 78 to determine if a generator overload condition exists.

Figure 3:
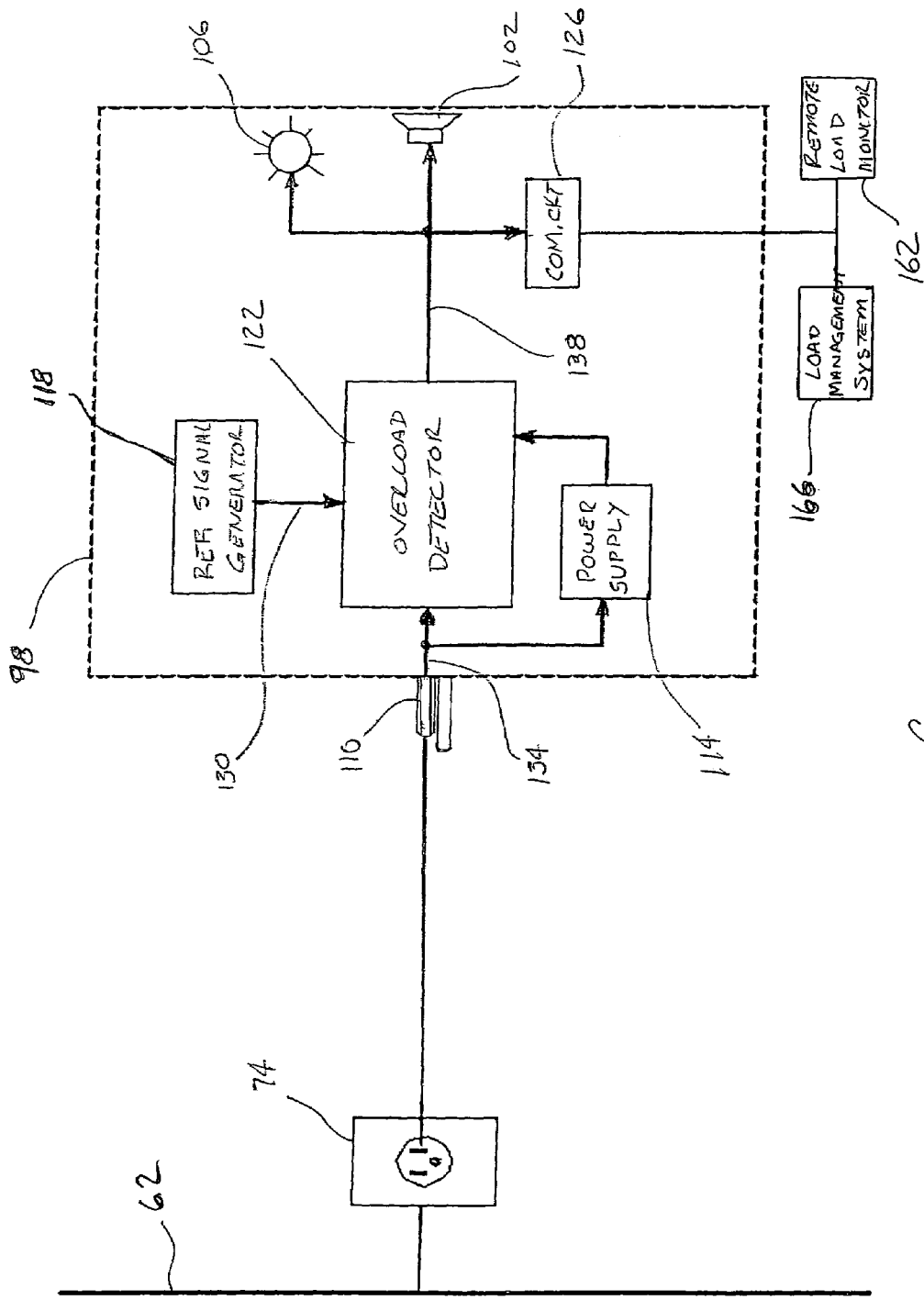
FIG. 3 is a block diagram of an overload detector/enunciator circuit constructed in accordance with the present invention.

FIG. 3 illustrates in a block diagram the overload detector/enunciator circuit 98. The circuit 98 includes a power supply 114, receiving power directly from the general circuit 62 and providing power to the detector/enunciator circuit 98, a reference signal generator 118, an overload detector 122, the audible enunciator 102 (noise making device) and/or a visual indicator 106 (light emitting device) and an optional communication circuit 126. The reference signal generator 118 provides to the overload detector 122, a reference signal 130 relative to the generator manufacturer's specified value of at least one generator power component being evaluated by the overload detector 122. If the manufacturer's specifications are not available, a desired value representative of the nominal value of the monitored power component on the utility grid 22 can be used. The overload detector 122, using the reference signal 130 and software or firm ware installed by the overload detector/enunciator circuit 98 manufacturer or the end user, derives by mathematical calculation, look-up table or referencing a pre-stored value, an alarm threshold. The overload detector 122 also receives, directly from the general circuit 62, a power quality signal 134 representative of the actual value of the at least one generator power component being evaluated by the overload detector 122. The overload detector 122 provides an overload signal 138 based on an evaluation of the power quality signal 134 with respect to the alarm threshold. If the evaluation of the power quality signal 134 indicates an overload condition, the overload detector 122 sends the overload signal 138 to the audible enunciator 102 and/or the visual indicator 106, thereby alerting the occupants to the overload condition. If the evaluation of the power quality signal 134 indicates no overload condition, the overload detector 122 does not send any signal to the audible enunciator 102 and/or the visual indicator 106. If the optional communication circuit 126 is present in the overload detector/enunciator circuit 98, the overload signal 138 will be sent to other devices, either in the facility 14 or remote to the facility 14, that have compatible communications circuits. These devices will be discussed in more detail later. The overload detector 122 monitors and evaluates the power quality signal 134 continuously or at a frequency sufficient to provide the overload signal 138 within a significantly short time, such as 5-10 electrical cycles of the generator's power output, when an overload condition is detected.

Figure 4A:
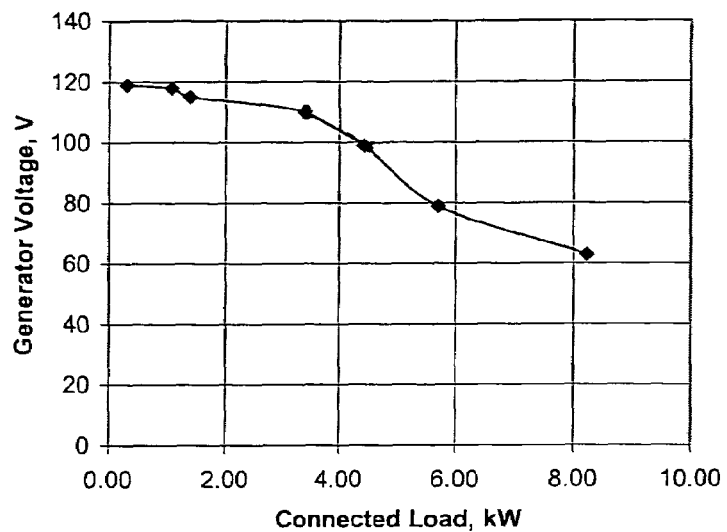
FIG. 4A is a graph of generator output voltage with respect to an increasing load on the generator.

FIG. 4A is a graph of generator output voltage to kilo-Watts consumed for a generator 78 rated at 4 kW. It can be seen that the generator's output voltage begins to drop almost immediately after a load is connected to the generator 78 and continues to drop as the total load on the generator 78 increases. As the load approaches the generator's kW rating the generator's output voltage approaches the minimum operating voltage for most electrical devices that are designed for standard 120 volt systems. Therefore, one of the power quality components that can be monitored by the overload detector 122 is generated voltage. In this case the alarm threshold can be a predetermined percentage of the no load generated voltage or a predetermined voltage level that will initiate an overload signal 138 from the overload detector 122.

Figure 4B:
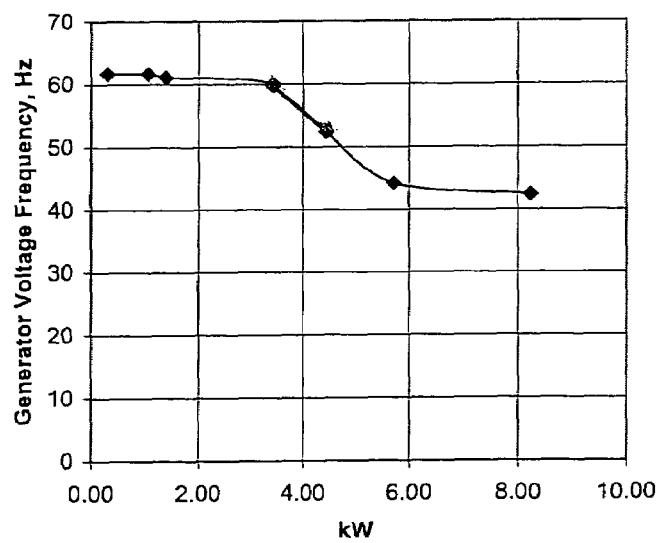
FIG. 4B is a graph of generator frequency with respect to an increasing load on the generator.

FIG. 4B is a graph of generator voltage frequency to kilo-Watts consumed for a generator rated at 4 kW. It can be seen that the generator frequency, in this case 60 Hz, remains relatively constant throughout the electrical distribution system 10 until the load approaches the generators kW rating and then begins to drop sharply as the load continues to increase. Therefore, another of the power quality components that can be monitored by the overload detector 122 is the generator frequency. The governor on most generators 78 can maintain the frequency within ±3 Hz of the manufacturer's specified frequency (usually 50 or 60 HZ). Some higher end generators 78 can maintain the frequency within 1 Hz of the rated frequency. The alarm threshold is selected to be slightly lower (approximately 1 Hz) than the low end of the manufacturer's specified frequency or approximately 93% of the manufacturer's specified frequency for the generator 78, to prevent overload signals 138 from being initiated by short frequency sags due to loads that have high inrush startup currents. In this case the alarm threshold can be a predetermined percentage of the manufacturer's specified generator frequency or a predetermined frequency, for instance approximately 58 Hz for a high end generator or approximately 56 Hz for a lower end generator, that will initiate an overload signal 138 from the overload detector 122. Monitoring the abrupt change in generator frequency, which remains relatively constant through out electrical distribution 10 regardless of the overload detector/enunciator 90 location, provides a more precise indication of an overload condition than monitoring the continuous drop in generator output voltage as the load increases. The generator output voltage, power quality signal 134, measured and evaluated by the detector/enunciator circuit 98 can be affected by the resistance of the electrical conductors in the electrical distribution system 10, and, therefore, by the location of the overload detector/enunciator 90 relative to the service entrance panel 18 and the loads in the system.

Figure 5A:
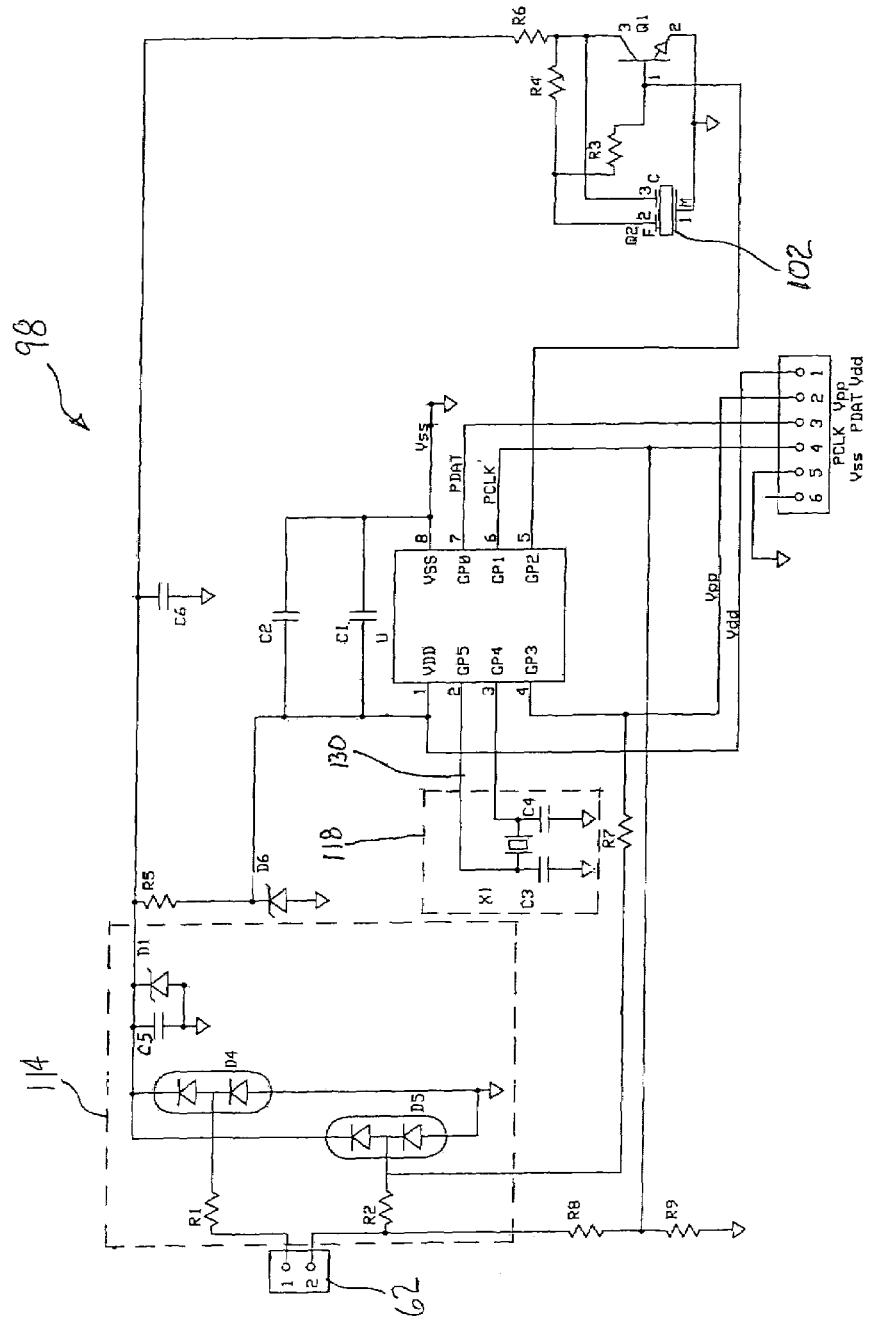
FIG. 5A illustrates one embodiment of a simple overload detector/enunciator circuit constructed in accordance with the present invention.

FIG. 5A illustrates one embodiment of a simple detector/enunciator circuit 98 for monitoring generator voltage frequency constructed in accordance with the present invention. The embodiment includes the power supply 114 comprised of resistors R1 and R2, rectifiers D4 and D5, capacitor C5 and a zener diode D1; the overload detector 122 comprised of a low cost microcontroller U (such as PIC12F675 manufactured by Microchip Technologies, Inc.), the reference signal generator 118 comprised of a general purpose crystal oscillator X1 of desired frequency (in this example a commercially available 32768 Hz oscillator) and the audible enunciator 102 capable of producing an easily heard and recognizable sound, such as a buzzer Q2 with a driver circuit Q1, R3, R4, and R6. In this embodiment the generator output AC voltage available on the general circuit 62 is clamped by the zener D1 at 12 Volts and is connected to the GP0 input of the controller U through resistor R7. The oscillator X1 provides a frequency reference signal 130 at input GP5 of microprocessor U. The microcontroller U repeatedly monitors the generator voltage frequency at input CP0, provided by the power quality signal 134, and compares it with the alarm threshold. If the actual generator voltage frequency drops below the alarm threshold, the microcontroller U switches pin CP2 from a low voltage state to a high impedance state, causing the overload signal 138 to be sent to the audible enunciator 102. In response to the overload signal 138 the buzzer Q2 begins to oscillate producing an audible signal that can be heard by occupants of the facility 14, alerting them to the generator's overload condition. When the generator's overload condition has been corrected by the occupants or by other mean, the generator voltage frequency will return to a normal level higher than the alarm threshold. This will cause pin CP2 to return to a low voltage state, thereby disabling the buzzer Q2 by pulling the base of the transistor Q1 to zero potential. The occupants will be alerted by the silenced buzzer Q2, that the generator 78 has returned to a normal operating condition. At this time they may elect to turn on some other load in the electrical distribution system that does not require as much power as the load that initiated the generator overload condition. In some instances the overload condition can be caused by critical loads that can not be selectively disconnected from electrical distribution system 10. The overload signal 138 and the audible enunciator 102 driver circuit can be configured to increase audible alarm in either intensity or frequency, or both, as the overload condition increases in magnitude.

Figure 5B:
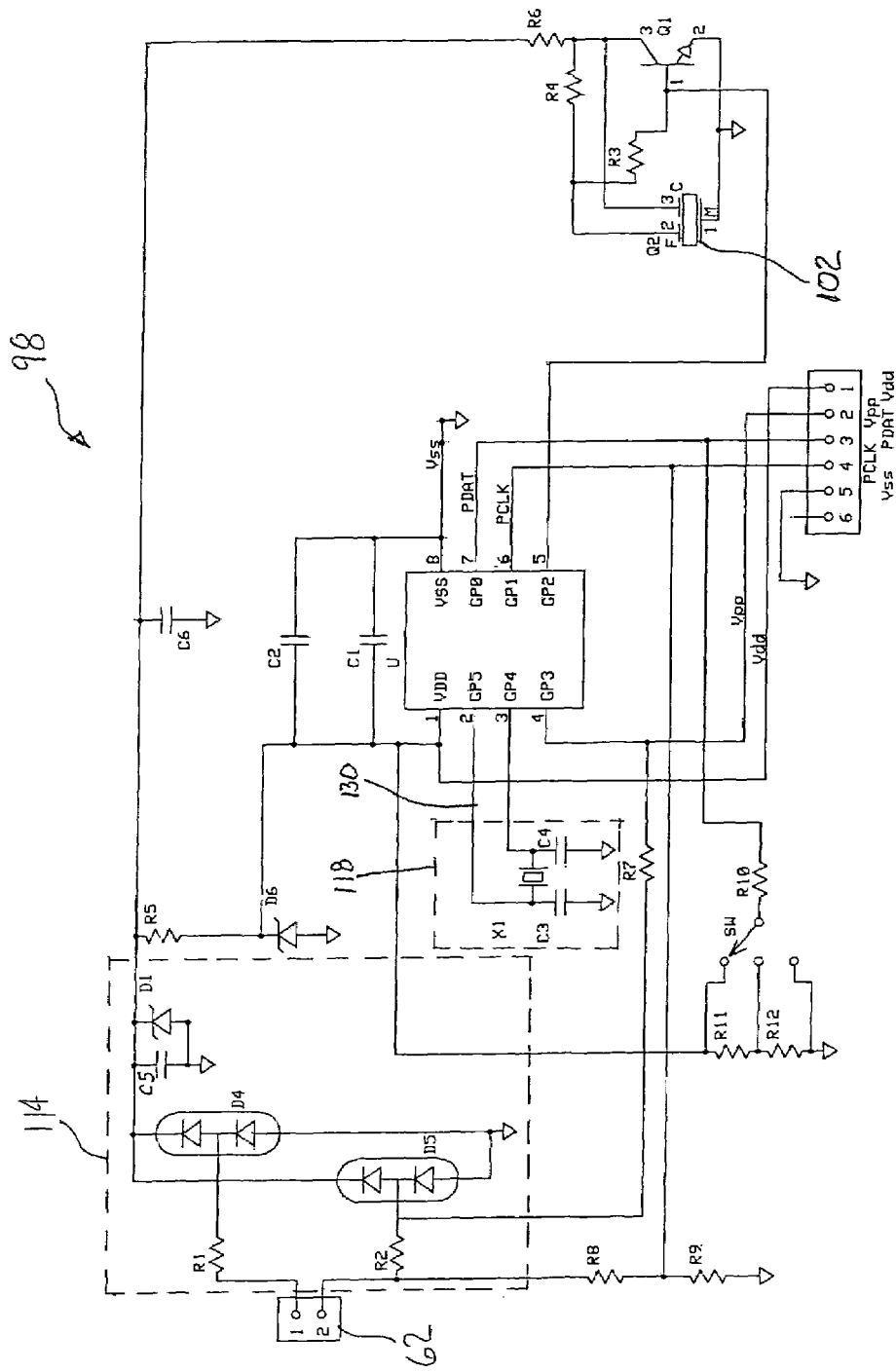
FIG. 5B illustrates an embodiment of an overload detector/enunciator circuit of FIG. 5A having a user selectable frequency range switch constructed in accordance with the present invention.

FIG. 5B illustrates an embodiment of the overload/enunciator circuit 98 of FIG. 5A having a frequency range selector switch SW. The range selector switch SW allows the occupants to select, by rotating dial 80 (FIG. 2), a frequency range closer to the generator manufacturers specified frequency range for more precise overload condition detection.

Generator output voltage can be another of the generator power components monitored for evaluation by the overload detector 122. The power quality signal 134 of the generator output voltage is derived from a voltage divider comprising two resistors R8 and R9. These resistors divide the generator output voltage of the general circuit 62 to the low voltage range acceptable for the analog-to-digital converter available in the microcontroller U, in this example the generator output voltage power quality signal 134 is applied to pin CP1. A voltage at the zener diode D6 can be used as the reference signal 130 for the detection of a generator overload condition. Using both criteria, generator frequency and generator output voltage, can increase the reliability of detecting a generator overload condition.

Figure 6B:
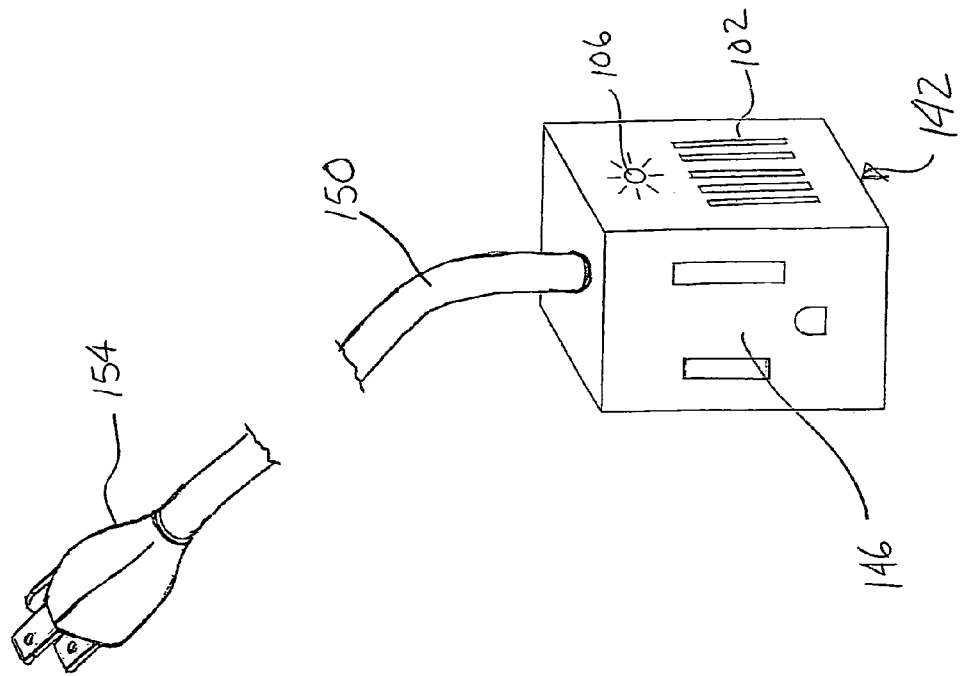
FIGS. 6A-6C illustrate other embodiment of an overload detector/enunciator constructed in accordance with the present invention.
Figure 6A:
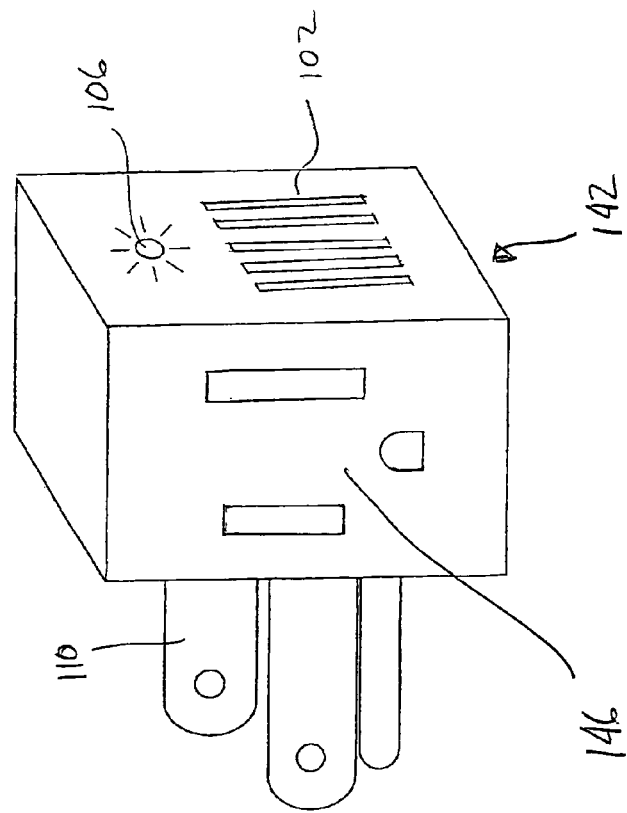
Figure 6C:
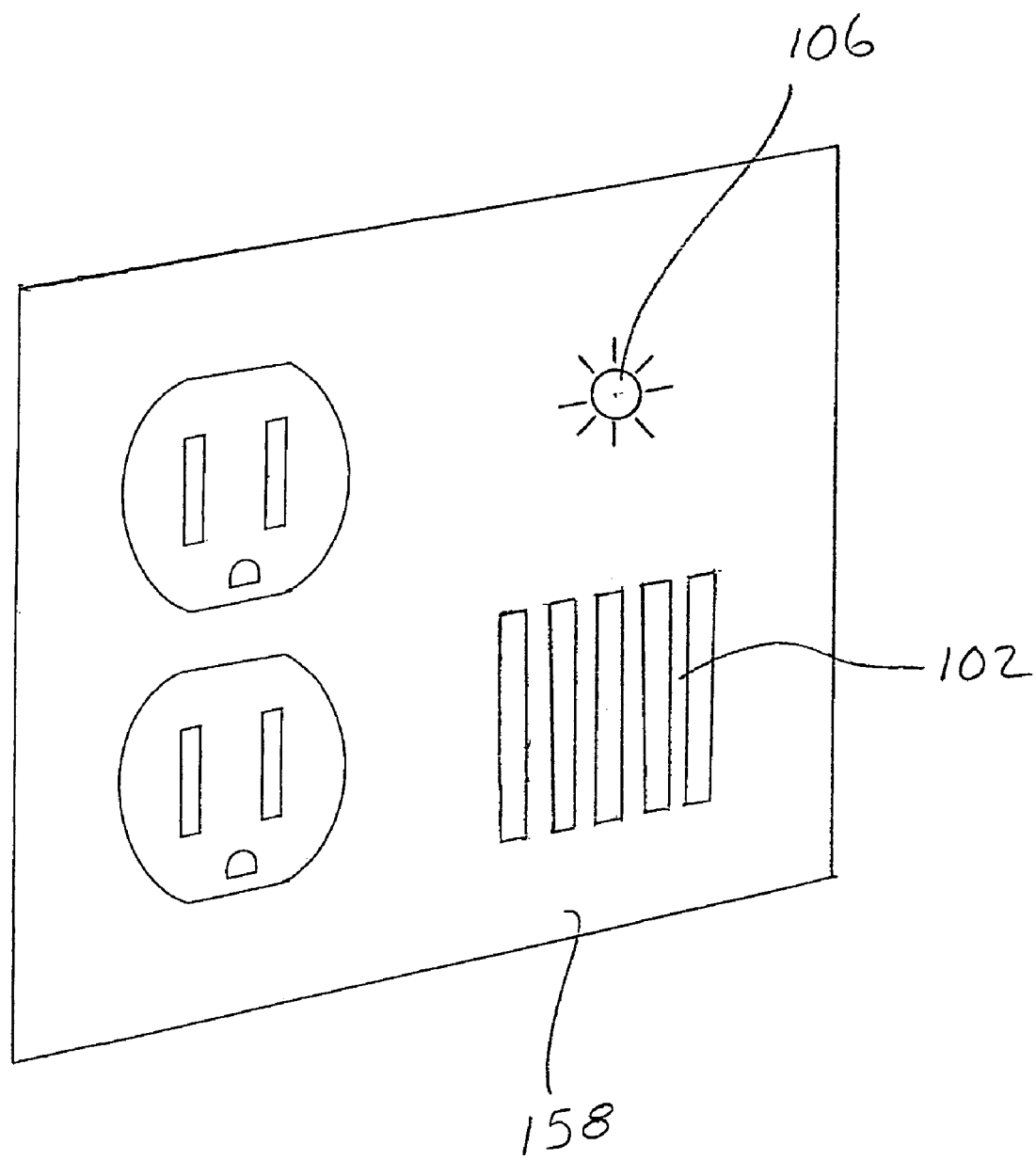

FIGS. 6A-6C each illustrate other embodiments of the overload detector/enunciator 90 constructed in accordance with the present invention. FIG. 6A illustrates an overload detector/enunciator 142, similar to the overload detector/enunciator 90 of FIG. 2, wherein at least one pass through receptacle 146 is provided such that the receptacle 74, into which the overload detector/enunciator 142 is plugged, can still be used for connecting load devices. Overload detector/enunciator 142 can also be used at the end of a standard extension cord, which might be plugged into one of the receptacles 74 or directly into a receptacle 74 located on the backup generator 78. FIG. 6B illustrates an extension cord 150 wherein the female or receptacle end of the extension cord 150 has a permanently attached overload detector/enunciator 142 configured with pass through receptacles 146 as in FIG. 6A for connecting to a load, and a plug 154 at the other end. FIG. 6C illustrates a receptacle faceplate 158 with provisions for one or both of the visible indicator 106 and audible enunciator 102 and an integral overload detector/enunciator circuit 98. The integral overload detector/enunciator circuit 98 could also be incorporated into other faceplates 150, such as a switch faceplate. In this embodiment the integral overload detector/enunciator circuit 98 is provided with means, such as wire pig tales, for being electrically connected directly to the receptacle 74 or switch 70. It is also within the scope of this embodiment that the faceplate 150 and receptacle 74 or switch 70 are integrally constructed and hardwired with the integral overload detector/enunciator circuit 98.

The detector/enunciator circuit 98 can be placed into any electrical appliance (stove, refrigerator, microwave, coffee pot, etc.). Many appliances already have a microprocessor and some form of alarm means such that the detector/enunciator features can be added by means of a software or firmware upgrade.

Detector/enunciator circuits 98 having the optional communication circuit 126 can also be in communication, by hard wiring, radio frequency, power line carrier, telephone, computer interface or other known and commercially available communications means, with a commercially available load monitor 162 located outside of the facility 14 or a commercially available automatic load management system 166 located either in the service entrance panel 18, a separate enclosure (not shown) or a remote location either within the facility 14 or outside the facility 14. For automatic load management a number of the branch circuit breakers 30 can be of the type that are remotely turned ON or OFF (commercially available from most circuit breaker manufacturers). These remotely controlled branch circuit breakers 30 can be used for load shedding and reconnection in response to a signal from the load management system, as the detector/enunciator circuit 98 determines the load condition of the generator 78. These remotely controllable branch circuit breakers 30 can be located in the service entrance panel 18, the generator sub panel 82 or an intelligent load center, which can include the transfer switch, load management system and branch circuit breakers.

I claim:

1. An overload detector/enunciator circuit comprising:
    a power supply connected to an electrical distribution system and providing power to the overload detector/enunciator circuit;
    a reference signal generator providing a reference signal representative of a desired value of at least one component of the electric power provided by the power supply to the electrical distribution system;
    a power quality signal taken directly from the electrical distribution system and being representative of the actual value of the same component of the electric power in the electrical distribution system as provided by the reference signal generator;
    a power supply overload detector receiving the reference signal and the power quality signal, the overload detector deriving an alarm threshold from the reference signal, evaluating the power quality signal with respect to the alarm threshold and providing a power supply overload signal when the power quality signal is below the alarm threshold, the power supply overload signal indicating that power consumption in the electrical distribution system is exceeding the power supply capacity, and;
    at least one enunciator device providing an alarm in response to receiving the power supply overload signal.

2. The overload detector/enunciator circuit of claim 1, wherein the Electrical distribution system power is provided by a local power source.

3. The overload detector/enunciator circuit of claim 2, wherein the local power source is a generator.

4. The overload detector/enunciator circuit of claim 1, wherein the desired Value is representative of a nominal value for the at least one component of the electrical power being monitored as provided on the utility grid.

5. The overload detector/enunciator circuit of claim 1, wherein the desired Value is representative of a manufacturer's specified value for the at least one Component of the electrical power being monitored.

6. The overload detector/enunciator circuit of claim 1, wherein desired value is representative of approximately 60 Hz.

7. The overload detector/enunciator circuit of claim 1, wherein desired value is representative of the no load voltage of the electrical distribution system.

8. The overload detector/enunciator circuit of claim 1, wherein the power quality signal is representative of the actual value of the at least one component of the electrical power being monitored.

9. The overload detector/enunciator circuit of claim 1, wherein the power quality signal is representative of the actual frequency of the electrical distribution System voltage.

10. The overload detector/enunciator circuit of claim 1, wherein the power quality signal is representative of the actual value of the electrical distribution system voltage.

11. The overload detector/enunciator circuit of claim 1, wherein the alarm threshold is a predetermined percentage of the reference signal value of the at least one component of the electrical power being monitored.

12. The overload detector/enunciator circuit of claim 1, wherein the alarm threshold is a predetermined value of the at least one component of the electrical power being monitored, stored in non-volatile memory.

13. The overload detector/enunciator circuit of claim 1, wherein the alarm threshold is one or more predetermined values of the at least one component of the electrical power being monitored, each value being stored in non-volatile memory and selectable by a user.

14. The overload detector/enunciator circuit of claim 1, wherein the alarm threshold is approximately 95% of the manufacturer's specified frequency.

15. The overload detector/enunciator circuit of claim 1, wherein the alarm threshold is approximately 1 Hz lower than the manufacturer's lowest specified frequency.

16. The overload detector/enunciator circuit of claim 1, wherein the alarm threshold is approximately 85% of the manufacturer's specified voltage.

17. The overload detector/enunciator circuit of claim 1, wherein the Overload detector is a microprocessor.

18. The overload detector/enunciator circuit of claim 1, wherein the at least One enunciator device provides an audible alarm in response to receiving the overload signal.

19. The overload detector/enunciator circuit of claim 18, wherein the audible alarm increases in intensity as the overload condition increases in magnitude.

20. The overload detector/enunciator circuit of claim 18, wherein the audible alarm increases in frequency as the overload condition increases in magnitude.

21. The overload detector/enunciator circuit of claim 1, wherein the at least one enunciator device provides a visual indication in response to receiving the overload signal.

22. The overload detector/enunciator circuit of claim 1, further includes a communication circuit for sending the overload signal to other devices having compatible communications circuits.

23. The overload detector/enunciator circuit of claim 1, further includes a communication circuit for sending the overload signal to an automatic load management system controlling selected loads on the electrical distribution system such that a maximum number of the selected loads can be used without overloading the electrical distribution system.

24. The overload detector/enunciator circuit of claim 1, further includes a communication circuit for sending the overload signal to an automatic load monitoring system.

25. The overload detector/enunciator circuit of claim 1, wherein the overload detector/enunciator circuit is located in an enclosure provided with a plug means for plugging into an electrical receptacle electrically connected to the electrical distribution system.

26. The overload detector/enunciator circuit of claim 25, wherein the enclosure is provided with at least one electrical receptacle for receiving an electrical plug of an electric device such that electric power from the electrical distribution system can be provided to the electrical device.

27. The overload detector/enunciator circuit of claim 26, wherein the enclosure is permanently connected to one end of an electrical extension cord having a plug at the other end for connecting to the electrical distribution system.

28. The overload detector/enunciator circuit of claim 1, wherein the Overload detector/enunciator circuit is located in a household appliance.

29. The overload detector/enunciator circuit of claim 1, wherein the overload detector/enunciator circuit is located in a faceplate for an electrical receptacle or switch.

30. An overload detector/enunciator circuit for detecting an overload condition in an electrical distribution systems receiving power from a backup generator comprising;
   a backup generator connected to an electrical distribution system and providing power to the overload detector/enunciator circuit;
   a reference signal generator providing a reference signal representative of the backup generator manufacturer's specified value of at least one component of the backup generator's electric power;
   a power quality signal taken directly from the electrical distribution system and being representative of the actual value of the same component of the backup generator's electric power being provided to the electrical distribution system as provided by the reference signal generator;
   a generator overload detector receiving the reference signal and the power quality signal, the overload detector deriving an alarm threshold from the reference signal, evaluating the power quality signal with respect to the alarm threshold and providing a generator overload signal when the power quality signal is below the alarm threshold, the generator overload signal indicating that power consumption in the electrical distribution system is exceeding the generator capacity, and;
   at least one enunciator device providing an audible and/or visible alarm in response to receiving the generator overload signal.

31. The overload detector/enunciator circuit of claim 30, further includes a communication circuit for sending the generator overload signal to other processing devices remote to the overload detector/enunciator circuit and having compatible communications circuits for receiving the overload signal.

32. The overload detector/enunciator circuit of claim 31, wherein the remote processing device is an automatic load management system controlling selected loads on the electrical distribution system such that a maximum number of the selected loads can be used without overloading the backup generator.

* * * * *